(12) United States Patent
Tomita

(10) Patent No.: US 6,212,311 B1
(45) Date of Patent: Apr. 3, 2001

(54) LIGHT SIGNAL TRANSMISSION SYSTEM AND LIGHT SIGNAL TRANSMISSION METHOD

(75) Inventor: Takaharu Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/025,358

(22) Filed: Feb. 18, 1998

(30) Foreign Application Priority Data

Oct. 6, 1997 (JP) .................................................. 9-272591

(51) Int. Cl.⁷ .............................. G02B 6/28; H04B 10/00
(52) U.S. Cl. .......................... 385/24; 359/341; 359/154; 359/160
(58) Field of Search ................................. 385/24, 27, 31, 385/39; 359/141–143, 152–154, 187, 188, 194, 341, 113, 134, 160, 345, 164

(56) References Cited

U.S. PATENT DOCUMENTS

| | | | |
|---|---|---|---|
| 5,060,302 | * 10/1991 | Grimes ................................. | 359/135 |
| 5,225,922 | * 7/1993 | Chraplyvy et al. ................... | 359/124 |
| 5,367,397 | * 11/1994 | Tajima ................................. | 359/152 |
| 5,448,390 | * 9/1995 | Tsuchiya et al. ..................... | 359/124 |
| 5,526,160 | * 6/1996 | Watanabe et al. .................... | 359/163 |
| 5,633,750 | * 5/1997 | Nogiwa et al. ....................... | 359/341 |
| 5,790,289 | * 8/1998 | Taga et al. ........................... | 359/124 |
| 5,801,860 | * 9/1998 | Yoneyama ............................ | 359/124 |
| 5,812,710 | * 9/1998 | Sugaya .................................. | 385/27 |
| 5,822,099 | * 10/1998 | Takamatsu ............................ | 359/153 |
| 5,852,510 | * 12/1998 | Meli et al. ............................ | 359/341 |
| 5,907,429 | * 5/1999 | Sugata .................................. | 359/341 |
| 6,141,468 | * 10/2000 | Kidorf et al. .......................... | 385/24 |

* cited by examiner

*Primary Examiner*—John D. Lee
*Assistant Examiner*—Juliana K. Kang
(74) *Attorney, Agent, or Firm*—Staas & Halsey LLP

(57) ABSTRACT

The present invention provides a light signal transmission system comprising: a first optical fiber for transmitting a light signal sent from a first terminal station to a second terminal station; a second optical fiber for transmitting a light signal sent from the second terminal station to the first terminal station; first and second optical amplification fibers, inserted along the route of the first and the second optical fiber respectively; first and second excitation light sources, being located away from the first and the second optical amplification fibers respectively, for supplying excitation light to the first optical amplification fibers; first and second control means for controlling first and second excitation level of the excitation light output from the first and second excitation light sources respectively in accordance with a difference between a first reception level of the light signal received by the first terminal station and a second reception level of the light signal received by the second terminal station. With this invention, the excitation level of the excitation light output by the excitation light sources is automatically adjusted in accordance with a difference in the reception levels.

22 Claims, 7 Drawing Sheets

FIG. 2

|  | Section A | Section B | Section C |
|---|---|---|---|
| Terminal Station 10 | 1.5dB loss | 1.0dB loss | 1.0dB loss |
| Terminal Station 20 | 1.0dB loss | 1.0dB loss | 1.5dB loss |

LIGHT SIGNAL TRANSMISSION SYSTEM AND LIGHT SIGNAL TRANSMISSION METHOD

BACKGROUND OF THE INVENTION

1. Field of the Invention

The present invention relates to a light signal transmission system employing an optical fiber, and in particular to a light signal transmission system including a rare-earth doped optical fiber amplifier controlled from a remote area. The rare-earth metal is, for example, Erbium.

2. Related Arts

A light signal transmission system is available for which an EDFA (Erbium Doped Optical Fiber Amplifier) is provided to facilitate the transmission of light signals through an optical fiber. In particular, a repeaterless light transmission system has recently become available in which excitation light produced by a excitation light source at a terminal station is supplied, by remote control, to an EDF (Erbium Doped Optical Fiber), that is optical amplification fiber, inserted into an optical fiber transmission path.

An example arrangement for a light signal transmission system using EDFAs is shown in FIG. 6. In FIG. 6, light signals are transmitted along an optical fiber 300 into which EDFs 310a and 310b are inserted. Excitation light is supplied by excitation light sources 200a and 200b, which are semiconductor laser light sources, and light signals are amplified in proportion to the excitation level of the excitation light. For light excitation, the excitation light source 200a is connected by an optical fiber 320a to a optical coupler 400a and the optical fiber 300, so that excitation light to excite the EDF 310a is transmitted along the optical fiber 300 in the same direction as light signals (this is called forward excitation); and the excitation light source 200b is connected by an optical fiber 320b to a optical coupler 400b and the optical fiber 300, so that excitation light to excite the EDF 310b is transmitted along the optical fiber 300 in the direction opposite to the light signal transmission direction (this is called backward excitation). An optical isolator 330 is located at the position shown in FIG. 6.

In the repeaterless light transmission system, the excitation light sources 200a and 200b are disposed at remote locations away from the EDFs 310a and 310b such as inside the two terminal stations connected at either end of the optical fiber 300. The terminal stations control the respective excitation light sources 200a and 200b to excite the EDFs 310a and 310b in order to amplify light signals. Through this process, a repeaterless light transmission system is accomplished which does not require an optical amplification repeater device for repeating light through the optical fiber 300 which connects the terminal stations.

For such a repeaterless light transmission system, in the design stage the EDFs 310a and 310b are inserted into predetermined locations along the optical fiber 300 having a predetermined length, and the excitation light sources 200a and 200b output excitation light having a predetermined energy.

In an optical submarine communication system for which the repeaterless light transmission system is employed, when the optical fiber 300 laid on the seabed is cut for some reason, the cut portions must be pulled up to the sea surface and a new optical fiber inserted between them (this is hereinafter referred to as an "insertion").

FIGS. 7A and 7B are specific diagrams illustrating an insertion. In FIGS. 7A and 7B, the optical fiber 300 is provided on the seabed at a depth h. When the optical fiber is cut at the portion indicated by the x, as is shown in FIG. 7A, the cut portions are pulled up to the sea surface, and a new optical fiber 340 is used to join the cut portions together, as is shown in FIG. 7B. At this time, for the optical fiber 340 a length of about 2.5 h is required, while taking into account a slight margin when the optical fiber is again deposited on the seabed.

When this insertion is performed, the length of the optical fiber between the two terminal stations is extended and is longer than the original designed length, and a transmission loss increase proportional to the length of the added portion of the optical fiber is incurred. Therefore, to compensate for the transmission loss, the signal light amplification rates for the EDFs 310a and 310b must be increased, and the excitation levels for the excitation light sources 200a and 200b must be manually re-adjusted.

SUMMARY OF THE INVENTION

It is, therefore, one object of the present invention to provide a light signal transmission system and a light signal transmission method for automatically adjusting the excitation levels of excitation light sources when an optical fiber transmission loss along a transmission path is changed due to an insertion.

To achieve the above object, a first arrangement for a light signal transmission system according to the present invention comprises:

a first optical fiber for transmitting a light signal sent from a first terminal station to a second terminal station;

a second optical fiber for transmitting a light signal sent from said second terminal station to said first terminal station;

a first optical amplification fiber, inserted along the route of said first optical fiber;

a second optical amplification fiber, inserted along the route of said second optical fiber;

a first excitation light source, being located away from said first optical amplification fiber, for supplying excitation light to said first optical amplification fiber;

a second excitation light source, being located away from said second optical amplification fiber, for supplying excitation light to said second optical amplification fiber;

first control means for controlling a first excitation level of said excitation light output from said first excitation light source in accordance with a difference between a first reception level of said light signal received by said first terminal station and a second reception level of said light signal received by said second terminal station; and second control means for controlling a second excitation level of said excitation light output from said second excitation light source in accordance with said difference between said first reception level and said second reception level.

In addition to the first arrangement, a second arrangement for a light signal transmission system according to the present invention comprises:

first detection means for detecting said first reception level;

second detection means for detecting said second reception level; and transmission means for transmitting said first and said second reception levels to said second and said first terminal stations respectively, wherein said first and said second control means each compare said first reception level with said second reception level.

With the above described arrangement, the excitation level of the excitation light output by the excitation light sources is automatically adjusted in accordance with a difference in the reception levels at the first and the second terminal stations.

When, for example, the reception level for the light signal received by the first terminal station is lower than the reception level for the light signal received by the second terminal station, the second control means increases the excitation level for the second excitation light source; and when the reception level for the light signal received by the second terminal station is lower than the reception level for the light signal received by the first terminal station, the first control means increases the excitation level for the first excitation light source.

In addition, the first or second control means may control the excitation level of the first or second excitation light source, so that the reception levels of the light signals received by the first and the second terminal stations are equal.

Furthermore, to achieve the above object of the present invention, provided is a method for transmitting light signals from a first terminal station to a second terminal station through at least one pair of optical fibers, both ends of which are connected to said first and second terminal stations, optical amplification fibers being inserted along the route of the pair of said optical fibers, and being supplied with excitation light output from excitation light sources located away from said optical amplification fibers, said method comprising the steps of:

detecting reception levels of light signals received by said first and said second terminal stations; and controlling an excitation level of said excitation light in accordance with a difference in said detected reception levels.

According to the light signal transmission method of the present invention, for example, the reception levels of light signals received by the first and the second terminal stations are transmitted to their opposite terminal stations, and the reception levels are compared individually by the two terminal stations to acquire a difference in the detected reception levels.

According to the light signal transmission method of the present invention, the excitation levels for the excitation light sources are controlled so as to increase a lower level of said detected reception levels. The excitation level of the excitation light may be controlled so that the reception levels of the light signals received by the first and the second terminal stations are substantially equal.

Further, according to the present invention, provided is a method for transmitting light signals from a first terminal station to a second terminal station through at least one pair of optical fibers, both ends of which are connected to said first and second terminal stations, optical amplification fibers being inserted along the route of the pair of said optical fibers, and being supplied with excitation light output from excitation light sources located away from said optical amplification fibers, said method comprising the steps of:

determining an section along a route of the pair of optical fibers at which an additional optical fiber is inserted in accordance with a difference in reception levels for light signals received by the first and the second terminal stations.

BRIEF DESCRIPTION OF THE DRAWING

FIG. 2 is a table showing changes in the reception levels of light signals at the terminal stations.

DETAILED DESCRIPTION OF THE PREFERRED EMBODIMENT

Figure 1:
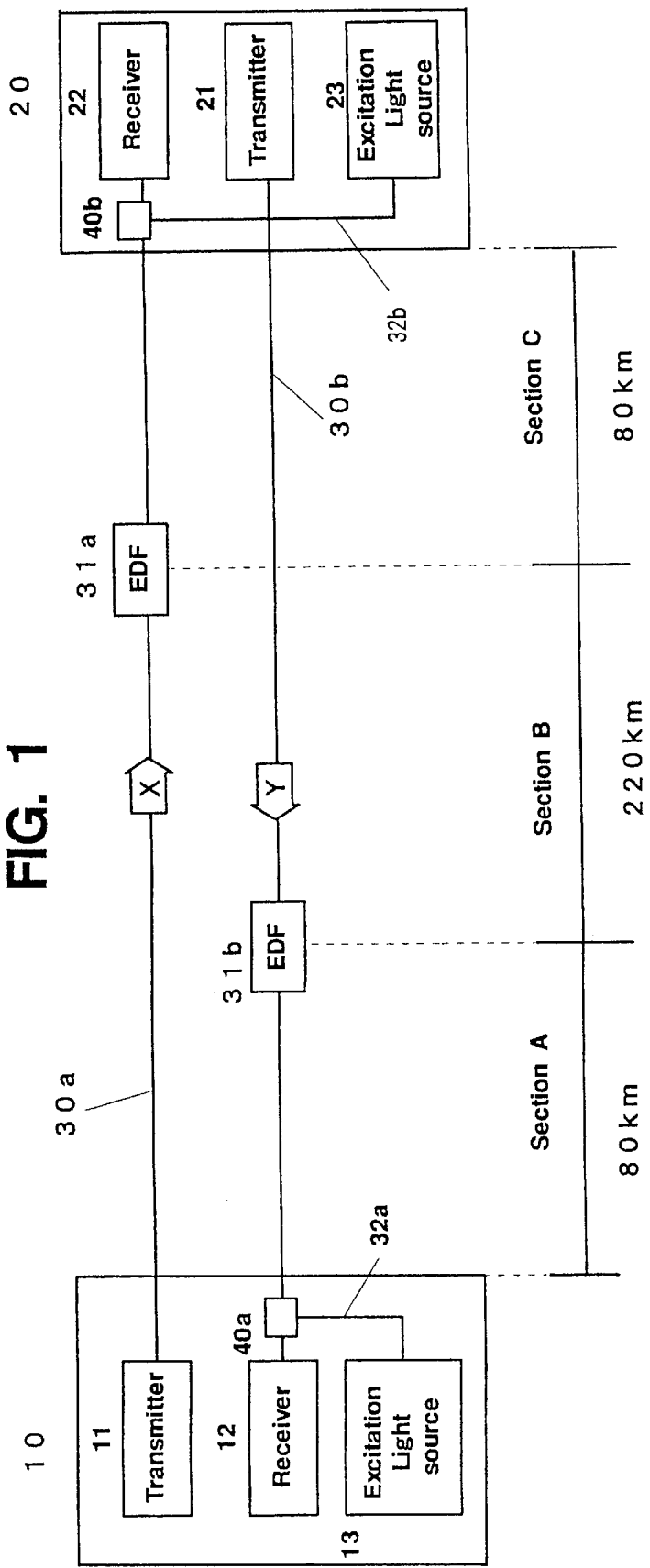
FIG. 1 is a block diagram illustrating a light signal transmission system according to one embodiment of the present invention.

The preferred embodiment of the present invention will now be described. The present invention, however, is not limited to this embodiment. The same reference numerals are used to denote identical or corresponding components shown in the drawings.

FIG. 1 is a block diagram illustrating a light signal transmission system according to one embodiment of the present invention. In FIG. 1, provided are an optical fiber 30a for transmitting a light signal in a direction X, i.e., from a first terminal station 10 to a second terminal station 20, and an optical fiber 30b for transmitting a light signal in a direction Y, i.e., from the second terminal station 20 to the first terminal station 10. The first and the second terminal stations 10 and 20 include transmitters 11 and 21 and receivers 12 and 22 respectively. In addition, the first terminal station 10 includes a excitation light source 13 for exciting an EDF 31b, which is inserted into the optical fiber 30b, and the second terminal station includes a excitation light source 23 for exciting an EDF 31a, which is inserted into the optical fiber 30a. The excitation light sources 13 and 23 employ, for example, a semiconductor laser to provide excitation light.

Excitation light output from the excitation light sources 13 and 23 transits excitation optical fibers 32a and 32b and optical couplers 40a and 40b, and is transmitted along the optical fibers 30a and 30b in directions opposite to the forward direction of light signals to excite the EDFs 31b and 31a (backward excitation).

As is shown FIG. 1, the EDF 31a is inserted at a location 300 km from the first terminal station 10 and 80 km from the second terminal station. The EDF 31b is inserted at a location 80 km from the first terminal station 10 and 300 km from the second terminal station 20.

The optical fibers 30a and 30b constitute a single cable, which connects the station terminals 10 and 20. Therefore, even when a transmission obstacle occurs in only one of the optical fibers, the above described insertion is performed for the entire cable, i.e., for all the fibers in the cable.

When the insertion is performed, the transmission loss for the optical fibers 30a and 30b is increased, as was previously described. FIG. 2 is a table showing changes in the reception levels of light signals at the terminal stations 10 and 20 when the sections between the terminal stations where insertion was performed are sections A, B and C in FIG. 1.

In FIG. 2, when the insertion is performed at section A within, for example, 80 km of the first terminal 10, and the transmission loss in section A is increased by, for example, 1 dB (decibel), the reception level of a light signal received by the receiver 22 of the second terminal station is reduced by 1 dB, which is proportional to the increase in the transmission loss. The reception level of a light signal received by the receiver 12 of the first terminal station 10 is reduced not only proportional to the transmission loss increase of 1 dB in the section A but also to the gain reduction of the EDF 31b, which will now be described.

As is described above, the excitation light from the excitation light source 13 of the first terminal station 10 is transmitted via the optical fiber 30b in section A to the EDF 31b. Therefore, the level of the excitation light, which is supplied to the EDF 31b in accordance with the transmission loss increase 1 dB for the section A, is reduced, and accordingly, the gain for the EDF 31b is reduced. That is, the reception level at the first terminal station 10 is reduced by 1.5 dB, which is the total of the transmission loss increase of 1 dB for the section A and the gain reduction (e.g., 0.5 dB). Therefore, the reception level at the first terminal station 10 becomes lower than the reception level at the second terminal station 20.

When the insertion is performed in the section C within, for example, 80 km from the second terminal station 20 and the transmission loss in the section C is increased by, for example, 1 dB, a phenomenon opposite to the above occurs. Specifically, the reception level at the first terminal station 10 is reduced by the equivalent of the transmission loss increase of 1 dB for the section C, while the reception level at the second terminal station 20 is reduced by 1.5 dB, which is also a total of the transmission loss increase of 1 dB for the section C and the gain reduction (eg., 0.5 dB) of the EDF 31a.

In addition, the insertion may be performed for section B, between the sections A and C. When a transmission loss for the section B is 1 dB, for example, the reception levels at the first and the second terminal stations 10 and 20 are reduced by 1 dB, which is the equivalent of the transmission loss for the section B. That is, since no gain reduction by the EDFs 31a and 31b occurs, the reception levels at the first and the second terminal stations 10 and 20 are reduced the same.

Therefore, in this embodiment, it is possible to employ a difference between changes in the reception levels between the first and the second terminal stations 10 and 20 to determine an section in which the insertion has been performed. That is, when a reduction in the reception level at the first terminal station 10 is greater than a reduction in the reception level at the second terminal station 20, it is ascertained that the insertion has been performed in the section A. When a reduction in the reception level at the second terminal station 20 is greater than a reduction in the reception level at the first terminal station 10, it is ascertained that the insertion has been performed in section C. When a reduction in the reception level at the first terminal station 10 equals a reduction in the reception level at the second terminal station 20, it is ascertained that the insertion has been performed in section B.

In the embodiment of the present invention, provided is an optical transmission system that monitors the reception levels at the two terminal stations, and when the changes in the reception levels differ (for example, when a transmission loss is increased in the section A or C, as described above), automatically adjusts the amplification rate of the EDF and maintains the reception levels at the two terminal stations.

To implement the embodiment of the present invention, provided are (1) methods for detecting reception levels at the two terminal stations; (2) methods for mutually transmitting a reception level from one terminal station to the other; and (3) a method for controlling the level of excitation light in accordance with a difference in the reception levels at the two terminal stations, which will be described later. Although an explanation will be given for the individual methods performed at the second terminal station 20, they can be applied in the same manner for the first terminal station 10.

Figure 3:
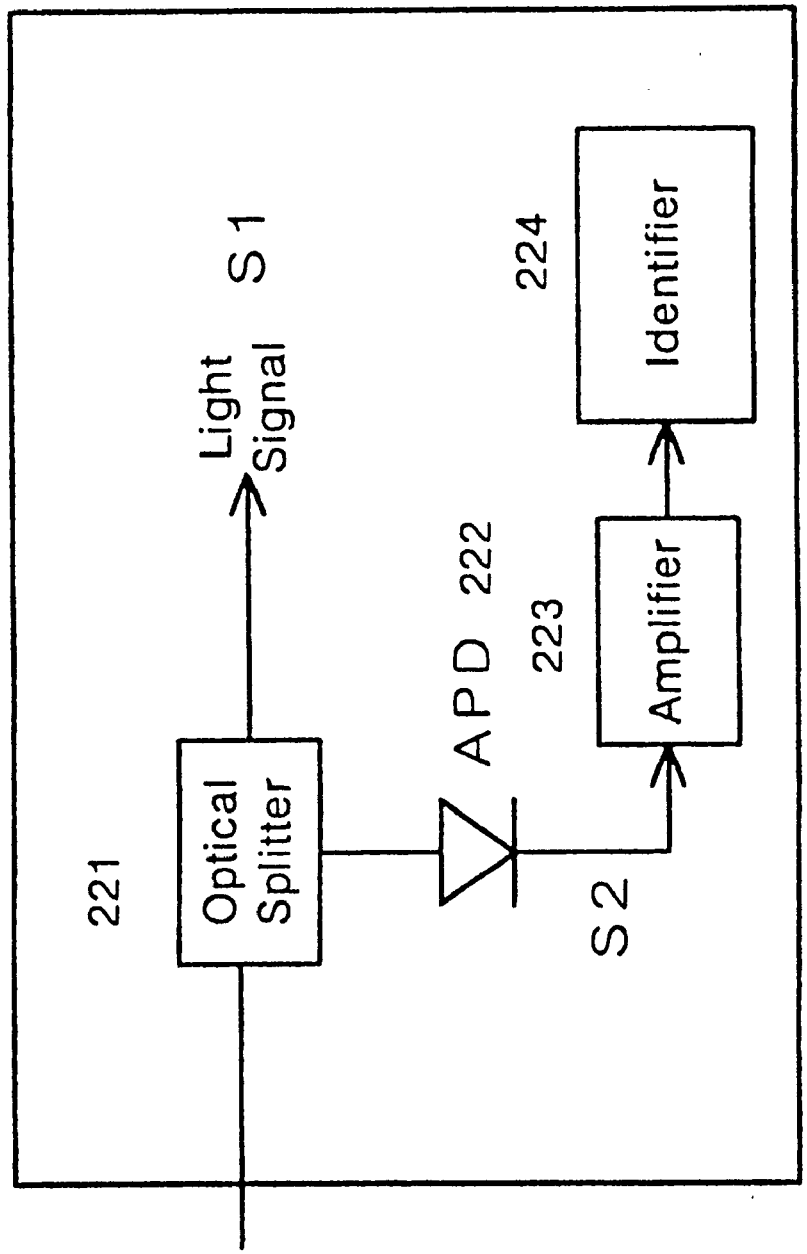
FIG. 3 is a diagram for explaining a first detection method according to the present invention.

First, (1) methods for detecting reception levels at both terminal stations will be described. FIG. 3 is a diagram for explaining a first detection method according to the present invention. According to the first detection method, one part of the light signal received at the second terminal station 20 is split and the signal level is detected. In FIG. 3, light signal light S1 is transmitted through the optical fiber 30a to the second terminal station 20, and only one part (a signal having an output level of 1/10 the input signal) of the light S1 is split at an optical splitter 221 provided in the receiver 22. Split light signal S2 is received by, for example, an avalanche photodiode (APD) 222, and converted into an electric signal in accordance with the received light intensity. The electric signal is amplified by an amplifier 223, and the level of the split signal light S2 is identified by a level identifier 224.

According to the first detection method, while the reception level of the light signal S1 can be precisely identified, as a special circuit for detecting a change in the reception level is required, the manufacturing costs for the system will be increased.

Figure 4:
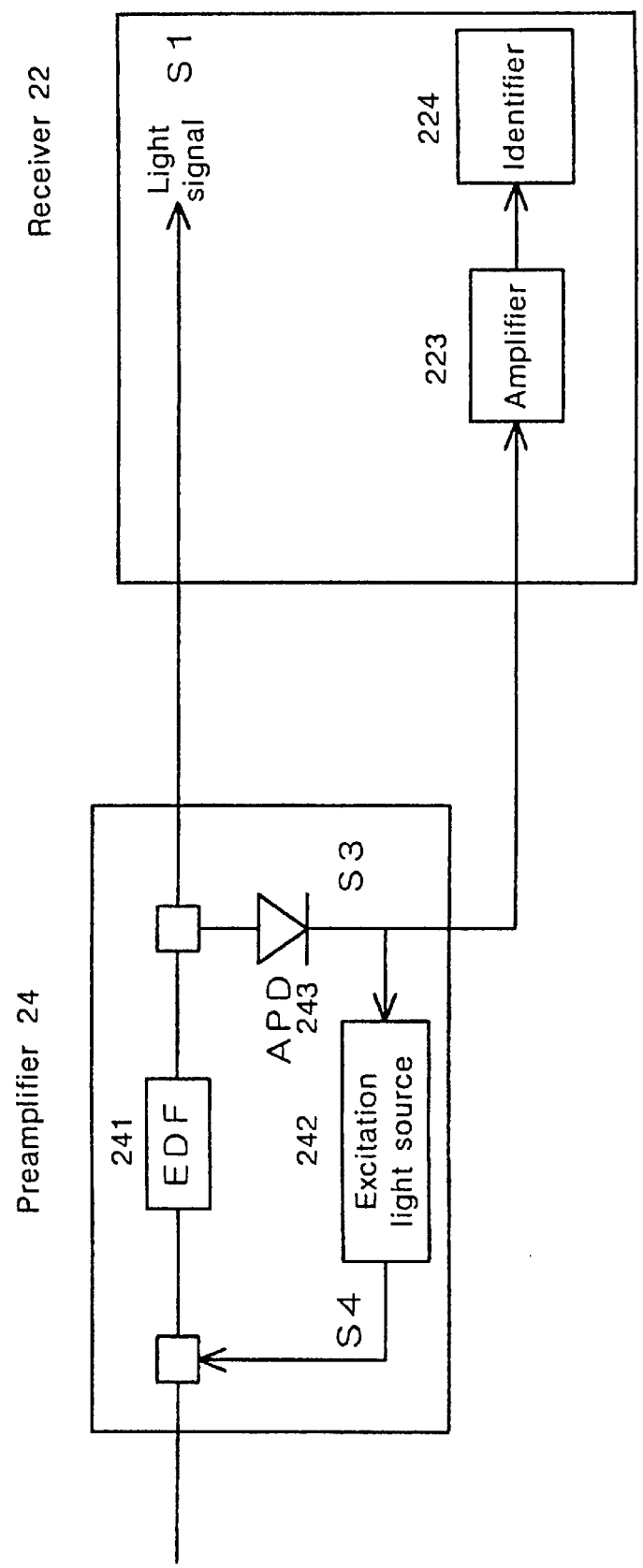
FIG. 4 is a diagram for explaining a second detection method according to the present invention.

FIG. 4 is a diagram for explaining a second detection method according to this embodiment. According to the second detection method, a preamplifier 24 (not shown in FIG. 1) is provided in front of the receiver 22 in the second terminal station 20 to amplify weak light signals, and based on a control signal from the preamplifier 24, the reception level of the light signal is detected. In FIG. 4, light signal S1, input at the second terminal station 20, is amplified by the preamplifier 24 and the resultant light is transmitted to the receiver 22. A excitation light source 242 for exciting an EDF 241 in the preamplifier 24 controls the excitation level of light, so that the output level of the light signal S1 amplified by the preamplifier 24 is constant.

More specifically, one part of the light signal S1 output by the preamplifier 24 is split, and is converted into an electric signal by an APD 243. The electric signal is then transmitted as a feedback control signal S3 to the excitation light source 242. In the same manner as in FIG. 3, the feedback control signal S3 is amplified by an amplifier 223 provided in the receiver 22, the resultant signal being transmitted to the level identifier 224 so that the reception level can be detected.

Although the accuracy of the second detection method is not as high as that of the first detection method, the system can be provided at a comparatively low cost because of the employment of the conventional preamplifier 24.

Then, (2) methods for mutually transmitting the reception level from one terminal station to the other will be described. The reception level at the second terminal station 20, which is detected by the above detection method, is transmitted to the first terminal station 10 by a method which will be described below. According to a first transmission method, a line, such as a public telephone line, is employed to transmit the reception level along a different route.

According to a second transmission method, a signal (not shown) having wavelength λ2, which differs from wavelength λ1 of the light signal S1, is generated by the transmitter 21, and the reception level information is transmitted to the terminal station 10 using the signal having wavelength λ2. At this time, the light signal having wavelength λ1, which is the light signal S1, and the light signal having wavelength λ2 are multiplexed, and the resultant signal is transmitted. A wavelength which is, for example, 2 nm to 3 nm away from the wavelength λ1 of the light signal S1, is employed as wavelength λ2.

According to a third transmission method, the reception level information is transmitted by using an empty bit included among overhead bits in the light signal S1 in a predetermined frame structure that is transmitted by the transmitter 21.

In the repeaterless light transmission system, generally, transmission distance is extended to the maximum. In this case, transmission quality may be degraded when compared with a common transmission system other than the repeaterless light transmission system. Therefore, to maintain the transmission quality for light signal S1, in the repeaterless transmission system, usually, the transmitter 11 in the terminal station 10 includes an FEC (Forward Error Correction) device (not shown) for generating an error correction bit corresponding to data for the light signal S1 to be transmitted, and for adding the error correction bit to the light signal S1 to produce a light signal having a new frame structure. That is, the transmitter 11 rearranges the light signal S1 in a frame structure which includes data information and its error correction bit, and transmits the rearranged light signal S1. At this time, an empty bit is generated in the overhead bit portion in the frame of the light signal S1. When the reception level information is added to the empty bit of the overhead portion, the reception level information can be transmitted to the terminal station 20.

Figure 5:
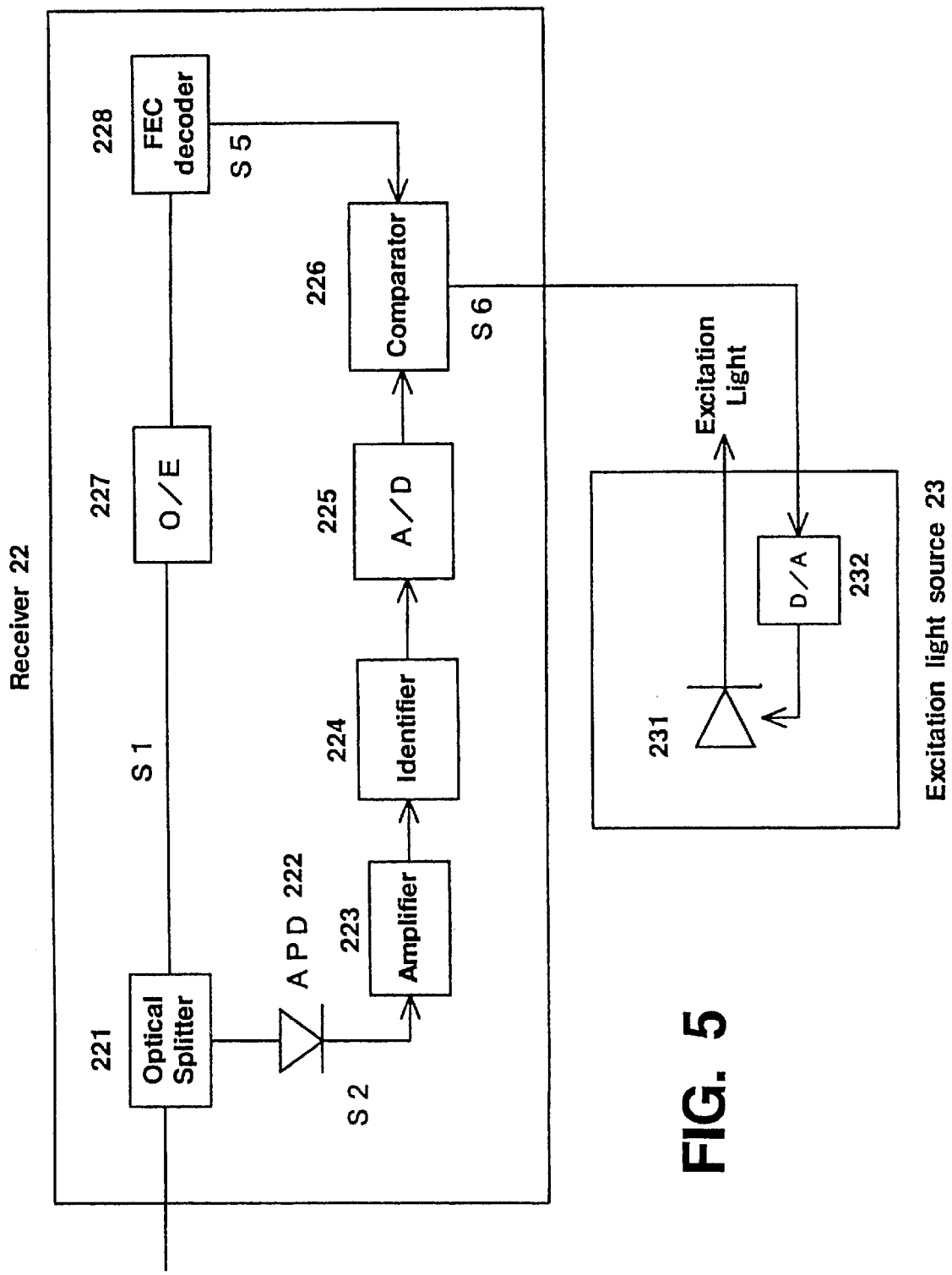
FIG. 5 is a diagram for explaining the method for controlling the excitation level.
Figure 6:
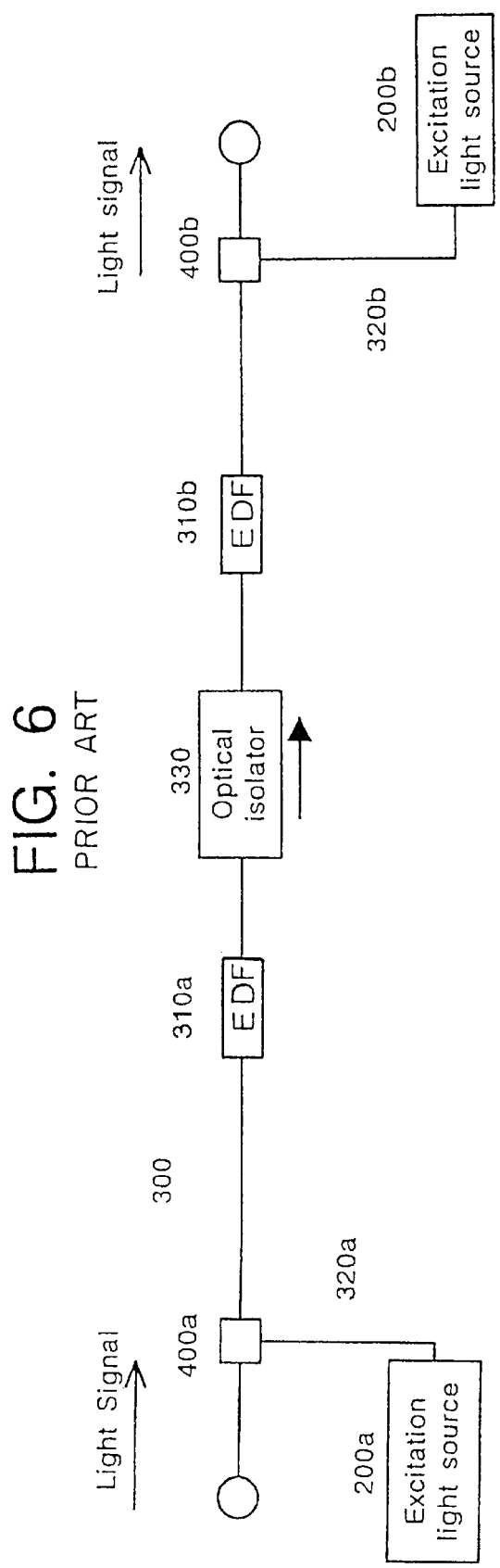
FIG. 6 is an example of arrangement for a light signal transmission system using EDFAs.
Figure 7A:
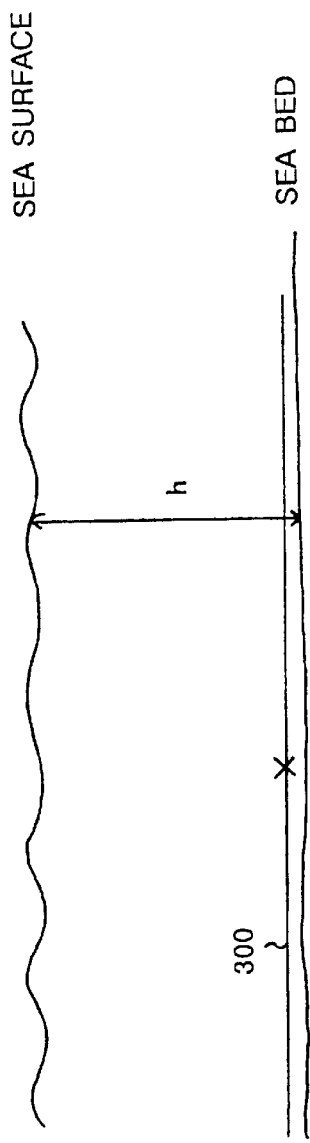
FIG. 7A and FIG. 7B is specific diagrams illustrating an insertion.
Figure 7B:
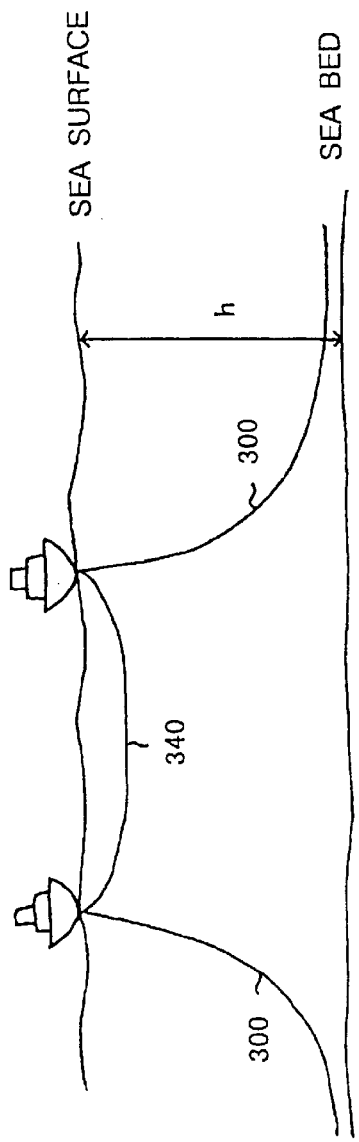

Following this, (3) a method for controlling the excitation level of light that corresponds to the difference in the reception levels at the two terminal stations will be described. FIG. 5 is a diagram for explaining the method for controlling the excitation level. At the terminal station 20, the received light signal S1 is split as is shown in FIG. 3, and based on the split signal S2 obtained, the reception level at the terminal station 20 is identified by the level identifier 224. As is shown in FIG. 5, the acquired reception level information is converted into a digital signal by an A/D converter 225, and the digital signal is transmitted to a comparator 226, which will be described later.

The reception level information at the terminal station 10 is transmitted by the above described transmission means using the third transmission method. Specifically, the reception level information is included in the overhead portion of the light signal S1. The light signal S1 is converted into an electric signal by an optical-electric converter (O/E) 227, and the electric signal is input to an FEC decoder 228 provided in the receiver 22. The overhead information of the light signal S1, i.e., reception signal information S5, is extracted by the FEC decoder 228, and is input to the comparator 226.

The comparator 226 outputs a digital signal S6, which corresponds to a difference in the two input reception levels, i.e., a difference between the reception levels at the terminal stations 20 and 10. The digital signal S6 is transmitted to the excitation light source 23.

At the excitation light source 23, the digital signal S6 is converted by a D/A converter 232 into an analog signal, which in turn is supplied as a drive current to the excitation light source 231, which is a semiconductor laser device. Since a drive current corresponding to a difference between the reception levels at the terminal stations is supplied to the excitation light source, the excitation level of the light provided by the excitation light source can be so adjusted that the reception levels at the two terminal stations are equal.

Specifically, when the reception level at the terminal station 20 goes lower than the reception level at the terminal station 10, the comparator 226 controls a drive current to be supplied to the excitation light source, so that the reception level at the terminal station 20 is raised until it is substantially equal to the reception level at the terminal station 10. That is, the comparator 226 increases the excitation level of the excitation light source 231.

When the reception level at the terminal station 10 goes lower than the reception level at the terminal station 20, the same control is exercised for the terminal station 10.

As is described above, when there is a difference between the reception levels of light signals at the two terminal stations, the excitation level for the excitation light source is automatically adjusted so that the reception levels at the terminal stations are equal. Therefore, even when the insertion of a submarine cable is performed and the reception level at one terminal station is reduced, constant reception levels can be maintained at both terminal stations without manual adjustment being required each time.

According to the present invention, in the repeaterless light transmission system wherein an EDFA is provided which is controlled by a remote operation, a gain for an EDF is automatically controlled even when a transmission loss in a transmission path, which is an optical fiber, is increased due to an insertion, and when the reception level at one terminal station is reduced.

Therefore, each time a transmission loss is varied due to an insertion, the reception levels are automatically adjusted so that they are constant, without manual control of them being exercised at both station terminals.

What is claimed is:

1. A light signal transmission system for maintaining a desired light signal amplification level between a first terminal and a second terminal comprising:

a first optical fiber transmitting the light signal from the first terminal to the second terminal and a second optical fiber transmitting the light signal from the second terminal to the first terminal, the first optical fiber having a first amplification fiber and the second optical fiber having a second amplification fiber;

a first excitation light source supplying excitation light to the second optical amplification fiber through the second optical fiber from the first terminal;

a second excitation light source supplying excitation light to the first optical amplification fiber through the first optical fiber from the second terminal; and a controller controlling an excitation level of the excitation light from at least one of the first and second excitation light sources in accordance with a difference between a level of the light signal received by the first terminal and a level of the light signal received by the second terminal.

2. The light signal transmission system according to claim 1, further comprising:

a first detector detecting the level of the light signal received by the first terminal;

a second detector detecting the level of the light signal received by the second terminal; and transmission means for transmitting the level of the light signal received by the first terminal to the second terminal and the level of the light signal received by the second terminal to the first terminal.

3. The light signal transmission system according to claim 2, wherein, when the level of the light signal received by the first terminal is lower than the level of the light signal received by the second terminal, the controller increases the excitation level of the excitation light from the second excitation light source; and wherein, when the level of the light signal received by the second terminal is lower than the level of the light signal received by the first terminal, the controller increases the excitation level of the excitation light from the first excitation light source.

4. The light signal transmission system according to claim 3, wherein the controller controls the excitation levels of the excitation lights from the first and second excitation light sources, so that the levels of the light signals received by the first and second terminals are substantially equal.

5. The light signal transmission system according to claim 2, wherein the controller controls the excitation levels of the excitation lights from the first and second excitation light sources, so that the levels of the light signals received by the first and second terminals are substantially equal.

6. The light signal transmission system according to claim 1, wherein, when the level of the light signal received by the first terminal is lower than the level of the light signal received by the second terminal, the controller increases the excitation level of the excitation light from the second excitation light source; and wherein, when the level of the light signal received by the second terminal is lower than the level of the light signal received by the first terminal, the controller increases the excitation level of the excitation light from the first excitation light source.

7. The light signal transmission system according to claim 6, wherein the controller controls the excitation levels of the excitation lights from the first and second excitation light sources, so that the levels of the light signals received by the first and second terminals are substantially equal.

8. The light signal transmission system according to claim 1, wherein the controller controls the excitation levels of the excitation lights from the first and second excitation light sources, so that the levels of the light signals received by the first and second terminals are substantially equal.

9. The light signal transmission system according to claim 1, wherein the optical amplification fibers are rare-earth metal doped fibers.

10. The light signal transmission system according to claim 9, wherein the rare-earth metal is Erbium.

11. A method for maintaining a desired light signal amplification level between a first terminal and a second terminal, the method comprising:
    transmitting a light signal from the first terminal to the second terminal through a first optical fiber and transmitting the light signal from the second terminal to the first terminal through a second optical fiber, the first and second optical fibers having optical amplification fibers;
    detecting amplification levels of light signals received by the first and the second terminals; and
    controlling an excitation level of an excitation light supplied to the optical amplification fibers of the first and second optical fibers in accordance with a difference in the detected amplification levels of the light signals received by the first and second terminals.

12. The method according to claim 11, further comprising the step of:
    transmitting the levels of light signals received by the first terminal to the second terminal and by the second terminal to the first terminal.

13. The method according to claim 12, wherein, the controlling step comprises controlling the excitation level of the excitation light so as to increase a lower level of the detected levels.

14. The method according to claim 13, wherein the excitation level of the excitation light is controlled so that the levels of the light signals received by first and second terminals are substantially equal.

15. The method according to claim 12, wherein said excitation level of the excitation light is controlled so that the levels of the light signals received by the first and second terminals are substantially equal.

16. The method according to claim 11, wherein, the controlling step comprises controlling the excitation level of the excitation light so as to increase a lower level of the detected levels.

17. The method according to claim 16, wherein the excitation level of the excitation light is controlled so that the levels of the light signals received by the first and second terminals are substantially equal.

18. The method according to claim 11, wherein the excitation level of the excitation light is controlled so that the levels of the light signals received by the first and second terminals are substantially equal.

19. The method according to claim 11, wherein said optical amplification fibers are rare-earth doped fibers.

20. A method for transmitting light signals between a first terminal and a second terminal, the method comprising:
    transmitting a light signal from the first terminal to the second terminal through a first optical fiber and transmitting the light signal from the second terminal to the first terminal through a second optical fiber, the first and second optical fibers having optical amplification fibers;
    detecting levels of the light signals received by the first and second terminals; and
    determining a section on the first and second optical fibers at which an additional optical fiber was previously inserted in accordance with a difference in the detected levels.

21. A light signal transmission system for maintaining a desired light signal level between a first terminal and a second terminal comprising:
    a first optical fiber transmitting the light signal from the first terminal to the second terminal and a second optical fiber transmitting the light signal from the second terminal to the first terminal, the first optical fiber having a first amplification fiber and the second optical fiber having a second amplification fiber;
    a controller controlling a level of an excitation light supplied to the first and second optical amplification fibers based on a difference between a level of a light signal received by the first terminal and a level of a light signal received by the second terminal so that the level of the light signal received by the first terminal is substantially the same as the level of the light signal received by the second terminal.

22. A light signal transmission system for maintaining a desired light signal amplification level between a first terminal and a second terminal, comprising:
    a first optical fiber transmitting the light signal from the first terminal to the second terminal and a second optical fiber transmitting the light signal from the second terminal to the first terminal, the first optical fiber having a first amplification fiber and the second optical fiber having a second amplification fiber;
    a first excitation light source supplying excitation light to the first optical amplification fiber through the first optical fiber from the second terminal;
    a second excitation light source supplying excitation light to the second optical amplification fiber through the second optical fiber from the first terminal; and
    a controller controlling an excitation level of the excitation light from at least one of the first and second excitation light sources in accordance with a difference between a level of the light signal received by the first terminal and a level of the light signal received by the second terminal.

* * * * *